(12) United States Patent
Lord et al.

(10) Patent No.: US 10,550,965 B2
(45) Date of Patent: Feb. 4, 2020

(54) HOSE ARRANGEMENTS

(71) Applicant: EXEL Industries SA, Paris (FR)

(72) Inventors: David Lord, Sutton Coldfield (GB); Michael Rose, Sutton Coldfield (GB)

(73) Assignee: EXEL INDUSTRIES SA, Paris (FR)

( * ) Notice: Subject to any disclaimer, the term of this patent is extended or adjusted under 35 U.S.C. 154(b) by 195 days.

(21) Appl. No.: 15/624,208

(22) Filed: Jun. 15, 2017

(65) Prior Publication Data

US 2017/0363230 A1  Dec. 21, 2017

(30) Foreign Application Priority Data

Jun. 15, 2016 (GB) ...................................... 1610378
Sep. 9, 2016 (GB) ...................................... 1615395

(51) Int. Cl.
*F16L 11/00* (2006.01)
*F16L 11/11* (2006.01)
*F16L 21/06* (2006.01)

(52) U.S. Cl.
CPC .............. *F16L 11/111* (2013.01); *F16L 21/06* (2013.01)

(58) Field of Classification Search
CPC .......... F16L 11/111; F16L 11/12; F16L 11/20; F16L 21/06
USPC .......................... 138/109, 121, 122, 125, 126
See application file for complete search history.

(56) References Cited

U.S. PATENT DOCUMENTS

| | | | |
|---|---|---|---|
| 6,279,614 B1* | 8/2001 | Riesselmann | B32B 1/08 138/137 |
| 9,772,054 B2* | 9/2017 | Pelletier | F16L 11/20 |
| 9,964,222 B1* | 5/2018 | Jones | F16K 17/36 |
| 2007/0023097 A1* | 2/2007 | Milhas | B29D 23/001 138/113 |
| 2013/0087205 A1* | 4/2013 | Berardi | F16L 11/00 137/1 |

(Continued)

FOREIGN PATENT DOCUMENTS

| | | |
|---|---|---|
| DE | 202015100073 U1 | 3/2015 |
| GB | 2490276 A | 10/2012 |

(Continued)

OTHER PUBLICATIONS

European Search Report dated Nov. 7, 2017, for corresponding EP Application No. 17175838.6, completed on Oct. 26, 2017.

(Continued)

*Primary Examiner* — James F Hook
(74) *Attorney, Agent, or Firm* — Heslin Rothenberg Farley & Mesiti P.C.; Victor A. Cardona, Esq.

(57) ABSTRACT

A hose arrangement includes an outer tube of flexible material and an inner tube of an elastic material for carrying fluid. Due to an action of the elastic inner tube, the hose has a shorter length in a contracted state in the absence of fluid pressure in the interior of the inner elastic tube and a longer length in an expanded state when the fluid pressure is applied to the interior of the elastic inner tube. The tube has an undulating state in the contracted state and controls and contains expansion of the inner tube when the hose is in the expanded state. At least one sleeve portion is provided between the elastic inner tube and the outer tube along a part of the elastic inner tube where undulation of the outer tube occurs in the contracted state for protecting the elastic inner tube from abrasion undulations of the outer tube.

16 Claims, 4 Drawing Sheets

(56) References Cited

U.S. PATENT DOCUMENTS

| | | | |
|---|---|---|---|
| 2013/0213514 A1* | 8/2013 | Berardi | F16L 11/00 138/109 |
| 2015/0007902 A1 | 1/2015 | Ragner | |
| 2015/0041016 A1 | 2/2015 | Ragner | |
| 2015/0308590 A1 | 10/2015 | Liang | |
| 2016/0146379 A1 | 5/2016 | LaTulippe et al. | |
| 2016/0215919 A1 | 7/2016 | Huang | |
| 2016/0245430 A1 | 8/2016 | Mezzalira et al. | |
| 2016/0312926 A1* | 10/2016 | Blanchette | B32B 1/00 |
| 2017/0363236 A1* | 12/2017 | Rose | F16L 33/2076 |

FOREIGN PATENT DOCUMENTS

| | | |
|---|---|---|
| GB | 2537138 A | 10/2016 |
| JP | 50-27608 A | 8/1975 |
| TW | 506913 U | 1/2015 |

OTHER PUBLICATIONS

GB Search Report for corresponding application No. GB1610378.0 dated Dec. 12, 2016.
GB Search Report for corresponding application No. GB1615395.9 dated Feb. 23, 2017.

* cited by examiner

HOSE ARRANGEMENTS

CROSS-REFERENCE TO RELATED APPLICATION

This application claims priority to GB Application No. 1610378.0 filed on Jun. 15, 2016, and GB Application No. 1615395.9 filed on Sep. 9, 2016, the entire disclosures of which are incorporated herein by reference.

TECHNICAL FIELD

This invention relates to hose arrangements.

BACKGROUND

The ideas in this specification are generally applicable to hoses of different types including industrial hoses, for example, hoses used in spraying applications as well as watering hoses including domestic, say, garden hoses. One example of the hoses to which the ideas relate are garden water supplying hoses of the type which have an expanded and increased length state when pressurised due to water flowing therethrough and a contracted state in the absence of such pressure.

Typically such hoses have an outer fabric based layer which can contract and in effect crumple as the hose contracts in a non-water filled state and some form of internal elastic member for causing the hose to move to a contracted state in the absence of water pressure.

One such existing expandable hose is described in GB2490276A. That hose has an outer tube formed of a non-elastic and flexible material and an inner tube constructed of an elastic material. The outer tube and the inner tube have a first end attached together by a first coupler and a second end attached by a second coupler. The hose has a shorter length a non-water flow contracted state and a longer length in an expanded state where water pressure is applied to the interior of the elastic tube. The water flow path is through the inner elastic tube whereas the outer tube serves to control and contain expansion of the inner tube in the expanded state. In the contracted state the outer tube is in a crumpled or undulating state, whereas in the expanded state the outer tube is relatively taut and restrains the inner tube against further expansion.

A potential drawback with a hose of the construction described in GB2490276A is that there can be a tendency for hose failure due to one or other of the couplers failing to successfully hold the inner or outer tube after a period of use or more generally that there is a tendency for such hoses to fail after an extended period of use.

Thus it would be desirable to provide an improved design of hose with better reliability/durability.

SUMMARY OF THE INVENTION

Whilst not at all immediately apparent, it has been determined by the applicants that one cause of failure in such hoses is that when such a hose expands and contracts a disproportionate amount of expansion and contraction takes place in the region of the couplers provided at each end of the hose. That is to say, on each hose usage, these end regions of the hose tend to expand and contract more than central regions of the hose. This in turn means that there is increased wear and stress in these regions.

Further again although not at all immediately apparent, the applicants have determined that one effect of this excessive expansion and contraction at these end regions is that there is wear on the inner elastic tube due to the outer tube, and in particular the undulations thereof, rubbing against the material of the inner tube.

Thus whilst it might be first thought that a tendency for failure of the inner hose to occur near the couplers was due to excessive radial expansion in this region and or damage done to the inner tube by the clamping mechanism in the couplers in fact there are further factors at play which have been uncovered by the applicant.

Having uncovered these factors the applicants have devised hose arrangements aimed at addressing these factors amongst others.

According to a first aspect of the present invention there is provided a hose arrangement comprising an outer tube of flexible material and an inner tube of an elastic material for carrying fluid through the hose arrangement, wherein due to the action of the elastic inner tube, the hose arrangement has a shorter length in a contracted state in the absence of fluid pressure in the interior of the inner elastic tube and a longer length in an expanded state when fluid pressure is applied to the interior of the elastic inner tube, and the outer tube has an undulating state when the hose arrangement is in the contracted state and serves to control and contain expansion of the inner tube when the hose arrangement is in the expanded state, wherein at least one sleeve portion is provided between the elastic inner tube and the outer tube along at least part of a length of the elastic inner tube where undulation of the outer tube occurs in the contracted state for protecting the elastic inner tube from abrasion by the undulations of the outer tube.

This can help improve the life/reliability of the hose arrangement due to the protection of the inner tube.

The arrangement may comprise a first hose end portion for receiving a first end of the outer tube and a first end of the elastic inner tube for use in coupling the first ends of the tubes together and a second hose end portion for receiving a second end of the outer tube and a second end of the elastic inner tube for use in coupling the second ends of the tubes together.

The first and/or second hose end portion may comprise an adaptor arranged for introduction in and clamping by a hose connector portion, such as a conventional hose fitting.

The first and/or second hose end portion may comprise a hose connector portion, such as a conventional hose fitting.

The first and/or second hose end portion may clamp the respective end of one or both of the inner tube and the outer tube. The respective end of one or both of the inner tube and the outer tube may be clampable to the first and/or second hose end portion.

The sleeve portion, the outer tube and the inner tube may be connected together at at least one location inwards of the ends of the outer and inner tubes.

Where there is a first and/or second hose end portion the at least one location may be inwards of the first and/or second hose end portion.

The sleeve portion may extend from the first and/or the second hose end portion to the at least one location.

The at least one location is preferably towards a respective end of the hose arrangement but inwards therefrom.

The sleeve portion may be connected to the first and/or the second hose end portion and/or connected to at least one of the inner and outer tube at the region of the first and/or the second hose end portion.

This can form a respective sleeved end region of the hose arrangement with the sleeve running between one of the first and second hose end portions and the location at which the sleeve portion is connected to the outer tube and the inner tube.

Moreover with the sleeve:

i) connected to the first and/or the second hose end portion and/or connected to at least one of the inner and outer tube at the region of the first and/or the second hose end portion; and ii) connected to the outer tube and the inner tube at at least one location inwards of the ends of the outer and inner tubes, the sleeve can help control longitudinal expansion of the inner tube in the region of the first and/or the second hose end portion.

In one set of embodiments the sleeve portion, the outer tube and the inner tube are connected together at at least one location inwards of the first ends of the outer and inner tubes and the sleeve portion is connected to the first hose end portion and/or connected to at least one of the inner and outer tube at the region of the first hose end portion so enabling control by the sleeve portion of longitudinal expansion and contraction of the hose arrangement between said at least one location and the first hose end portion.

There may be two sleeve portions. A first of the sleeve portions may be connected to the outer tube and the inner tube at a first location which is inwards of a first end of the tubes. A second of the sleeve portions may be connected to the outer tube and the inner tube at a second location which is inwards of a second end of the tubes.

The first and/or second location is preferably towards a respective end of the hose arrangement but inwards therefrom.

The first sleeve portion may be connected to the first hose end portion and/or connected to at least one of the inner and outer tube at the region of the first hose end portion.

The second sleeve portion may be connected to the second hose end portion and/or connected to at least one of the inner and outer tube at the region of the second hose end portion.

This can form a respective sleeved end region at each end of the hose arrangement with the respective sleeve portion running between the respective one of the first and second hose end portions and the location at which the respective sleeve portion is connected to the outer tube and the inner tube.

Moreover with the first sleeve portion:

i) connected to the first hose end portion and/or connected to at least one of the inner and outer tube at the region of the first hose end portion; and ii) connected to the outer tube and the inner tube at at least one location inwards of the ends of the outer and inner tubes, the first sleeve portion can help control longitudinal expansion of the inner tube in the region of the first hose end portion.

Similarly with the second sleeve portion:

i) connected to the second hose end portion and/or connected to at least one of the inner and outer tube at the region of the second hose end portion; and ii) connected to the outer tube and the inner tube at at least one location inwards of the ends of the outer and inner tubes, the second sleeve portion can help control longitudinal expansion of the inner tube in the region of the second hose end portion.

In one set of embodiments the second sleeve portion, the outer tube and the inner tube are connected together at at least one location inwards of the second ends of the outer and inner tubes and the second sleeve portion is connected to the second hose end portion and/or connected to at least one of the inner and outer tube at the region of the second hose end portion so enabling control by the second sleeve portion of longitudinal expansion and contraction of the hose arrangement between said at least one location and the second hose end portion.

Having the at least one sleeve portion connected in this way to control the longitudinal expansion and hence contraction of the hose arrangement in the region of the/each hose end portion can also control the degree to which the undulations of the outer tube move relative to the inner tube in the region of the/each hose end portion. Thus this can reduce the stress which this portion of the inner tube experiences by reducing the degree of longitudinal expansion and can reduce the wear caused by the undulations rubbing on the inner tube/sleeve portion by virtue of the resulting reduced reciprocating motion in this region.

Thus this structure where there is joining of the outer tube to the inner tube at at least one location part way along the length of the hose arrangement is particularly beneficial. More beneficial still is providing two such joins each close to but inwards from a respective end of the hose arrangement, so that the hose arrangement is protected at each of its ends.

The at least one sleeve portion may extend beyond the location at which it is connected to the outer tube and the inner tube.

The hose arrangement may comprise a joiner member at the location at which the at least one sleeve portion is connected to the inner and outer tubes.

The outer tube, inner tube and sleeve portion may all be attached to the joiner member.

The outer tube may be heat welded to the joiner member. The sleeve portion may be bonded to the joiner member. The inner tube may be bonded to the joiner member.

The joiner member may be tubular. The outer tube may be connected to an outer curved surface of the joiner member. The sleeve portion may be connected to an inner curved surface of the joiner member. The inner tube may be connected to an inner curved surface of the joiner member.

There may be an aperture or a break in the sleeve portion in the region of the joiner member. The joiner member may bridge the aperture or break in the sleeve portion.

The outer tube may be of a non-elastic material. Alternatively the outer tube may have elasticity to some degree in one or more direction provided that it acts to retain the inner tube. The outer tube may be termed an outer retaining tube. For example, the outer tube may be elastic in the longitudinal direction and non-elastic in the radial or circumferential direction. In another case the outer tube may be elastic but less elastic than the inner tube.

The outer tube may be of fabric. The inner tube may be of elastomeric material. The sleeve portion may be of elastomeric material.

The hose arrangement may comprise a clamping member for clamping at least one of the outer tube, the inner tube and the sleeve portion to the hose end portion. The clamping member may clamp the outer tube, the inner tube and the sleeve portion to the hose end portion.

The clamping member may comprise a collar or ferrule.

The clamping member may be deformable into position to clamp the or each clamped component. In such a case the clamping member will typically be of metal and typically swaged, crimped, pressed or otherwise deformed into position.

Alternatively the clamping member may be threadingly enageable with the hose end portion to clamp the or each clamped component. This can be advantageous since it facilitates demounting of a component which may, for example, allow replacement or interchanging of the component. The clamping member may comprise a threaded nut.

The hose assembly may comprise an expansion retainer for controlling radial expansion of the inner tube. The expansion retainer may comprise a support surface for supporting the inner tube. The support surface may be flared. The expansion retainer may comprise a flared bore. The support surface may bound the flared bore.

The clamping member may comprise the expansion retainer and thus have a supporting surface with a profile selected to support the inner tube. The clamping member may have a flared, for example cone shaped or trumpet shaped, supporting surface. The clamping member may comprise a bore with a flared portion, with a first part of the bore arranged for clamping the inner tube and a flared part of the bore arranged for supporting the clamped inner tube.

This may relieve stress on the tube and/or the clamping of the tube due to radial expansion. In turn this may help to guard against failure.

The sleeve portion may extend longitudinally inwards of the end of the hose end portion as alluded to above. The sleeve portion may extend longitudinally inwards of the clamping member. The sleeve portion may extend longitudinally inwards of the expansion retainer where present.

Note that the sleeve portion is arranged to protect the inner tube in the region where undulations occur and move, and this is usually beyond any extent of the clamping member and/or expansion retainer. Further note that the sleeve portion can help protect against the effects of longitudinal expansion of the inner tube whereas the support portion can help protect against the effects of radial expansion.

The first hose end portion may, for example, comprise one of: a nozzle; a spray gun; a sprinkler; a watering lance; a tap (faucet) connector; a hose fitting—for allowing connection of the hose arrangement to another water source or outlet device; or so on.

The second hose end portion may, for example, comprise one of: a nozzle; a spray gun; a sprinkler; a watering lance; a tap (faucet) connector; a hose fitting—for allowing connection of the hose arrangement to another water source or outlet device; or so on.

In each case the respective hose end portion may comprise a standard hose connector portion.

According to a second aspect of the present invention there is provided a hose arrangement comprising a first hose end portion, a second hose end portion and connected therebetween an outer tube of flexible material and an inner tube of an elastic material for carrying fluid through the hose arrangement, wherein a first end of the inner and outer tubes are coupled together at the first hose end portion, a second end of the inner and outer tubes are coupled together at the second hose end portion and due to the action of the elastic inner tube, the hose arrangement has a shorter length in a contracted state in the absence of fluid pressure in the interior of the inner elastic tube and a longer length in an expanded state when fluid pressure is applied to the interior of the elastic inner tube, and the outer tube has an undulating state when the hose arrangement is in the contracted state and serves to control and contain expansion of the inner tube when the hose arrangement is in the expanded state, wherein at least one sleeve portion is provided between the elastic inner tube and the outer tube along at least part of a length of the elastic inner tube where undulation of the outer tube occurs in the contracted state for protecting the elastic inner tube from abrasion by the undulations of the outer tube.

According to a third aspect of the present invention there is provided a method of manufacturing a hose arrangement comprising an outer tube of flexible material and an inner tube of an elastic material for carrying fluid through the hose arrangement, wherein due to the action of the elastic inner tube, the hose arrangement has a shorter length in a contracted state in the absence of fluid pressure in the interior of the inner elastic tube and a longer length in an expanded state when fluid pressure is applied to the interior of the elastic inner tube, and the outer tube has an undulating state when the hose arrangement is in the contracted state and serves to control and contain expansion of the inner tube when the hose arrangement is in the expanded state, the method comprising the step of providing at least one sleeve portion between the elastic inner tube and the outer tube along at least part of a length of the elastic inner tube where undulation of the outer tube occurs in the contracted state for protecting the elastic inner tube from abrasion by the undulations of the outer tube.

As will be clear, the above defined hose arrangements can be used in many different circumstances—for example industrial situations, such as for example spraying applications, as well as domestic situations. The carried fluid may be a liquid, in some cases this will be water, but it might also be another liquid. One particular application is a water supplying (say watering) hose, for example, a garden water supplying hose.

Each of the optional features following each of the aspects of the invention above is equally applicable as an optional feature is respect of each of the other aspects of the invention and could be written after each aspect with any necessary changes in wording. The optional features are not written after each aspect merely in the interests of brevity.

BRIEF DESCRIPTION OF THE DRAWINGS

Embodiments of the present invention will now be described, by way of example only, with reference to the accompanying drawings in which.

DETAILED DESCRIPTION

Figure 1:
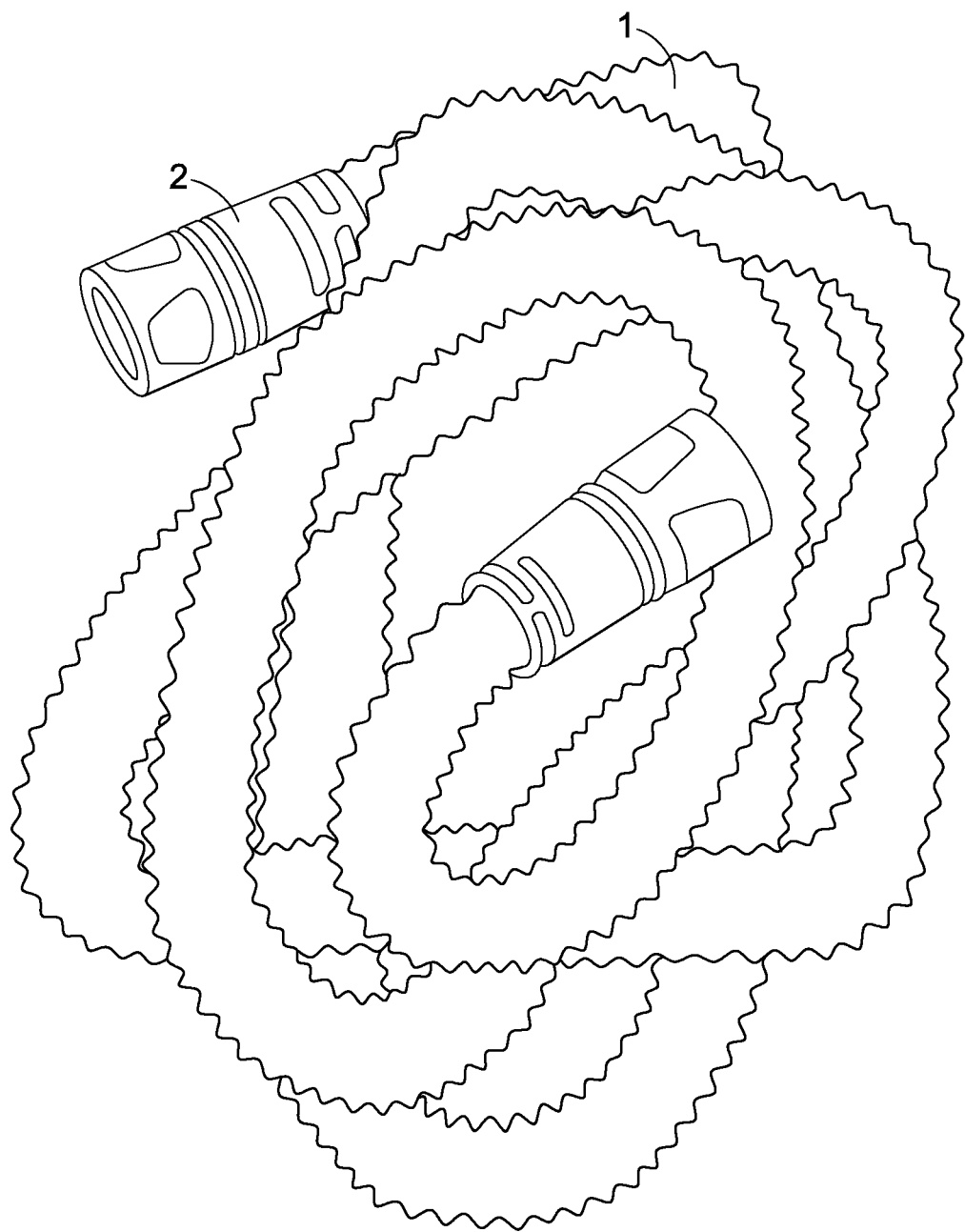
FIG. 1 schematically shows a garden water supplying hose arrangement in a contracted state.
Figure 2:
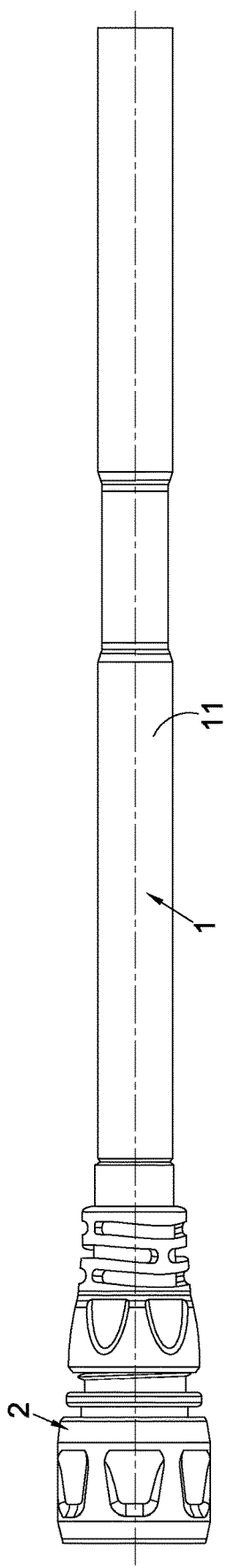
FIG. 2 schematically shows part of the hose arrangement of FIG. 1 in an extended state.
Figure 3:
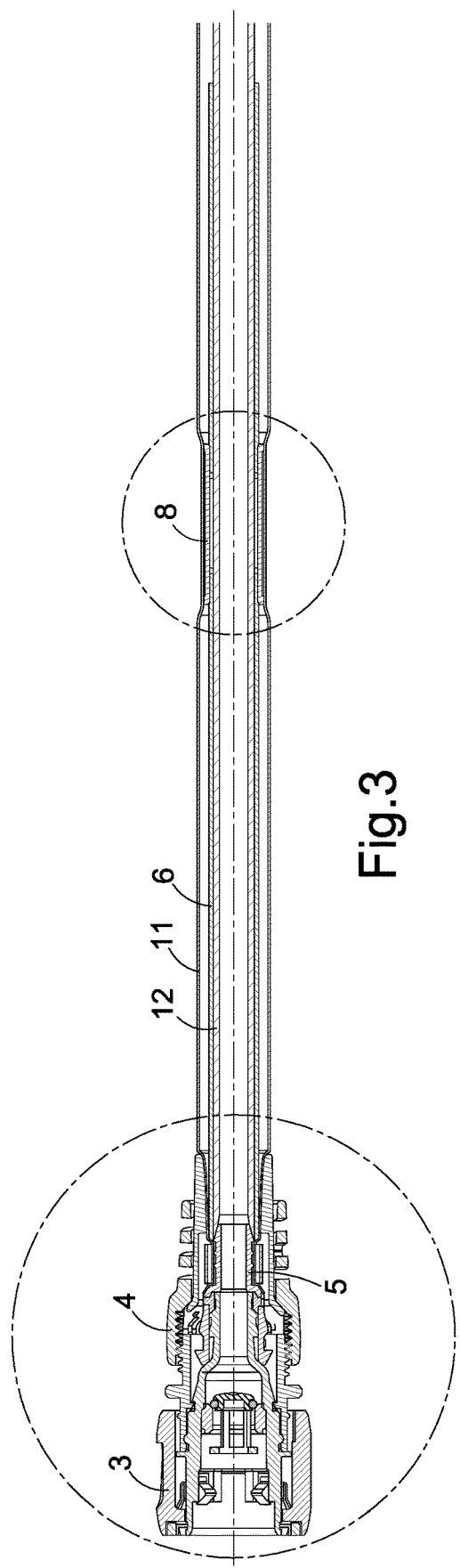
FIG. 3 is a sectional view of the part of the hose arrangement shown in FIG. 2.

FIGS. 1 to 3 schematically show a hose arrangement comprising a hose assembly 1 provided at each end with a respective hose end component 2 (only one of which can be seen in FIGS. 2 and 3) the hose arrangement is a garden watering hose arrangement for use in, for example, domestic gardens when watering plants and/or washing surfaces. FIG. 1 shows the hose arrangement in a contracted state which will tend to be adopted when there is no water in the hose assembly. On the other hand FIGS. 2 and 3 show part of the hose arrangement of FIG. 1 in an extended state which will tend to be adopted when water flows through the hose assembly.

Whilst the present description is directed to this type of garden watering hose it is noted again that the ideas in the present invention are more generally applicable than this. They may be used, for example, in other types of watering hoses in non-domestic situations and moreover in other applications for example, industrial applications, including say spraying.

Figure 4:
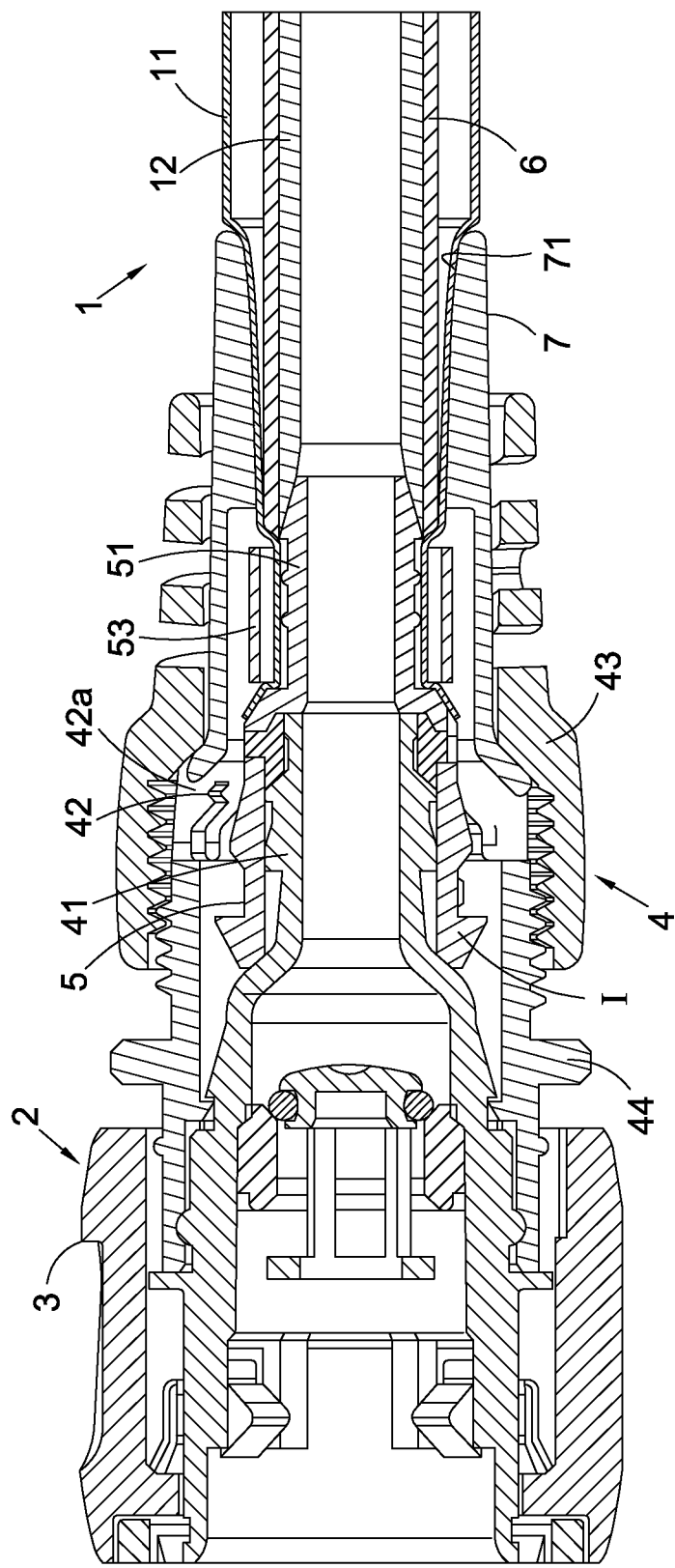
FIG. 4 is a detail of the view shown in FIG. 3 showing a first hose end component of the hose arrangement shown in FIGS. 1 to 3 mounted on the end of a hose assembly of the hose arrangement shown in FIGS. 1 to 3.

FIG. 4 shows one of the hose end components 2 and one end of the hose assembly at an enlarged scale. In the present embodiment the other hose end component is identical. In alternatives however, there may be differences between the hose end components 2.

In the present embodiment the hose end component 2 is in the form of a hose fitting which is arranged to allow the hose arrangement to be connected to other components. In particular, for example, one of the hose fittings may be connected to a tap or another source of water and the other hose fitting to maybe connected to a spray gun, a nozzle or other outlet device. In the present embodiment each hose fitting is an industry standard female push fit hose fitting which is arranged to allow connection to a complimentary male fitting provided on another component.

As shown in FIG. 4 the hose fitting comprises a fitting portion 3 and a connector portion 4. The fitting portion 3 is arranged for connection to the complimentary male fitting portion provided on another component. Since this part of the fitting 2 is a standard piece of garden watering equipment and is not a particular pertinence to the present invention, further description of it is omitted.

Further note that in other cases, different forms of hose end component 2 may be used in the hose arrangement. Thus, for example, in fact the type of hose fitting 2 shown in FIG. 4 is of a slightly different type than that shown in FIG. 1. Furthermore the hose end component might be a nozzle, spray gun, watering lance or some other component. Provided that this hose end component 2 has a connector portion for connecting to a hose it may be connected to the hose assembly 1. To put this another way, the hose assembly 1 of the present embodiment is suitable for use with many different hose end components.

In the present embodiment, the connector portion 4 comprises a spigot 41 which is arranged to be received in the internal bore of a piece of hosepipe to be connected to the connector portion 4. Further, the connector portion 4 comprises a plurality of deformable griping fingers 42. A locking nut 43 is provided to drive the deformable fingers 42 into the outer surface of a piece of hose received on the spigot 41 as the locking nut is tightened onto the main body 44 of the connector portion. In this embodiment the deformable fingers are provided with teeth 42a for biting into the outer surface of the hose and as will be appreciated the locking nut and main body 44 of the connector 4 have interengaging threads for allowing tightening of the nut onto the main body 44. The hose assembly 1 is arranged to be received in the connector portion 4 and is shown so received in FIG. 4. Similarly of course the hose assembly 1 is arranged to be received in any similar hose connector portion in particular one comprising a spigot, a plurality of gripping fingers and for use with a locking nut.

The hose assembly 1 comprises a first outer tube 11 of non-elastic and flexible material, for example, a woven plastic material and a second inner elastic tube 12 which is for carrying water through the hose assembly 1 and hence the whole hose arrangement.

Note that in alternatives the outer tube may be of material with elasticity to some degree in one or more direction provided that it acts to retain the inner tube. The outer tube may be termed an outer retaining tube. For example the outer tube may be elastic in the longitudinal direction and non-elastic in the radial or circumferential direction. In another case the outer tube may be elastic but less elastic than the inner tube.

In the present embodiment each end of the hose assembly 1 is provided with a respective adaptor 5. Of course only one of these adaptors 5 may be seen in FIG. 4.

The adaptor 5 is generally tubular with a through bore through which water may flow between the interior of the inner tube 12 and an internal bore of the fitting portion 3 or more generally an internal bore of the hose end component 2 which comprises the connector portion 4. Thus this through bore forms part of the water flow path through the hose assembly and the whole hose arrangement.

As well as the inner and outer tubes 12, 11 the hose assembly 1 comprises two elastomeric sleeve portions 6 (only one of which can be seen in the drawings). The first of these sleeve portion 6 is provided at a first end of the hose arrangement as shown in FIGS. 2 to 5 whereas the other elastomeric sleeve portion 6 is provided at the opposite end of the hose arrangement.

Each sleeve portion 6 is provided in the hose assembly between the inner tube 12 and the outer tube 11. As will be appreciated the sleeve 6 is another tubular portion. In the present embodiment the outer tube 11, sleeve 6, and inner tube 12 are all mounted to a support portion 51 of the adaptor 5 by a metal ferrule 53. (Note that the metal ferrule 53 adopts a crenellated or castellated form when deformed into its clamping position as shown in FIG. 4 and the section shown in FIG. 4 is taken through one of these crenellations such that one can see a section through the top of one of the crenellations and then a side wall of the crenellation descending down into contact with the clamped tubes and sleeve 11, 12, 6.)

As well as the support portion 51 the adaptor 5 comprises an insertion portion I which is clamped by the deformable fingers 42 of the connector portion 4.

Thus in the present embodiment by virtue of the adaptor portion 5 and the metal ferrule 43 acting as a clamping portion, the outer tube 11 the inner tube 12 and the sleeve 6 are secured in the hose end component 2. Thus in this embodiment the hose end components 2 and adaptor portion 5 together form a first hose end portion.

Note however that the hose assembly 1 comprising the outer tube 11, the inner tube 12, and sleeve 6 as mounted to the adaptor 5 via the ferrule 53 can also be considered to be a complete hose arrangement in itself and that in that case the hose end portion is the adaptor 5.

In this embodiment the hose arrangement also comprises an expansion retainer 7 which is provided to control expansion of the outer tube 11 and hence inner tube 12 in the region where these are clamped to the adaptor 5. The expansion retainer 7 comprises a support surface 71 for supporting the inner tube 12 against expansion in the region of the ferrule 53.

The supporting surface 71 of the expansion retainer 7 is flared outwards to allow gradual increase in diameter of the inner tube when subjected to pressure. The support surface defines a flared bore in the retainer 7. In the present embodiment the expansion retainer 7 is captured by the locking nut 43 and as such is indirectly mounted to the adaptor 5. Further it will be noted that this expansion retainer 7 serves to support the inner tube against expansion even though the outer tube 11 and the sleeve 6 lie between the inner tube and the expansion retainer 7.

In the present embodiment, as described above the expansion retainer 7 is retained by the locking nut 43. In alternatives the expansion retainer could be formed as part of the locking nut 4 or a clamping member used to secure at least one of the tubes, or the sleeve portion 11, 12, 6 to the adaptor 5.

In the present embodiment the elastomeric sleeve 6 is provided in the region of ferrule 53 and thus helps to protect against damage to the inner tube 12 during clamping and also protects it during expansion which can help prevent hard and or sharp parts of the ferrule 53 instigating a rupture of the inner tube.

However, in the present embodiment the elastomeric sleeve 6 also extends beyond the clamping region. In particular the sleeve 6 extends longitudinally inwards of the end of the hose end component 2 and adaptor 5 (that is longitudinally inward beyond the hose end portion) and particularly longitudinally inward of the end of the expansion retainer 7 and its supporting surface 71.

This means that the sleeve 6 can provide other functions than just protecting the inner tube 12 from the effects of clamping and the effects of radial expansion in the region of the clamp.

Figure 5:
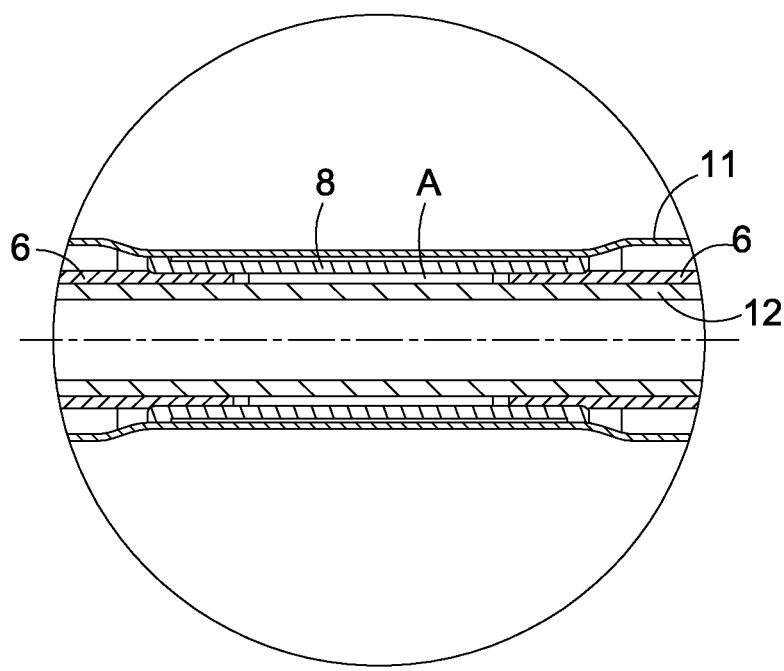
FIG. 5 is a detail of the view shown in FIG. 3 showing a portion of the hose assembly at a location where an outer tube and inner tube and a sleeve portion of the hose assembly are joined together via a joiner member.

As shown in FIGS. 3 and 5 the elastomeric sleeve 6 extends a significant distance into the outer and inner tubes 11, 12.

In the present embodiment the hose arrangement comprises two tubular joiner members 8 each of which is provided at a respective location which is spaced longitudinally inwards from the respective hose end component 2. Only a first of these joiner members 8 is shown in the drawings. This joiner member 8 is associated with the first hose end component 2 shown in FIGS. 2, 3 and 4 and there is a corresponding joiner member 8 associated with the other hose end component 2 which is not shown in the drawings. The outer tube 11, the inner tube 12 and the elastomeric sleeve 6 are joined to one another at the location of the joiner member 8. In the present embodiment the outer tube 11 is heat welded to an outer curved surface of the joiner member 8 whilst the elastomeric sleeve 6 and inner tube 12 are bonded (using adhesive) to the joiner member 8. In particular a silicon sealant based adhesive may be used.

In the present embodiment the elastomeric sleeve 6 extends beyond the joiner member 8 so as to extend further longitudinally inwards into the outer tube 11 than the location at which the joiner member 8 is located. Thus in the present embodiment a break or aperture A is provided in the elastomeric sleeve 6 in the region of the joiner member 8 to facilitate bonding between the inner tube 12 and the joiner member 8.

The location at which the sleeve 6, outer tube 11 and inner tube 12 are connected together, and hence the location of the joiner member 8 is such as to be towards the end of the hose arrangement but inwards of the hose end portion. The location may be described as close to the extremity of the hose arrangement. Where there are two sleeves, one at each end of the hose arrangement all these consideration will of course be true for both. The optimal distance of this location from the end of the hose arrangement has been found largely independent of the overall length of the hose arrangement. The optimal spacing from the end of the hose arrangement has been found to be in the range of 100 mm to 340 mm, say preferably 200 mm to 240 mm or around 220 mm. If the spacing is too small inadequate protection against longitudinal expansion is given. If the spacing is too large the overall expansion capable by the hose arrangement is compromised.

The joiner member itself may have a length of say 40 mm, but this in not critical.

As will be appreciated where, as in the present embodiment, a second elastomeric sleeve is provided at the second end of the hose arrangement, it can have the same construction as that described above in relation to the first elastomeric sleeve.

The provision of the elastomeric sleeve 6 in the present embodiment provides different functions. First it is provided in a region where, as mentioned in the introduction, there is excessive longitudinal expansion and contraction of the hose arrangement in use between the contracted state as shown in FIG. 1 and the extended state as shown in FIG. 2. This means that the elastomeric sleeve portion 6 can serve to protect the inner tube 12 from abrasion which would otherwise occur by virtue of the undulations in the outer tube 11 rubbing on the surface of the inner tube 12. This beneficial effect can be seen both in the portion of the elastomeric sleeve 6 provided between the joining member 8 and the hose end component 2 and the portion of the elastomeric sleeve 6 where this extends further into the hose than the location of the joiner member 8. Further the elastomeric sleeve 6 can help control radial expansion if suitably chosen in diameter and strength.

Furthermore because the elastomeric sleeve 6 is joined to the inner and outer tubes 12, 11 at the joiner member 8 and is retained at the hose end component 2, longitudinal contraction and expansion of this region of the hose arrangement also requires longitudinal expansion and contraction of the elastomeric sleeve 6. As will be appreciated this can tend to control and consequently reduce the longitudinal expansion and hence contraction which takes place in this region since the additional elastic material in this region will increase the amount of force which is required to provide a given degree of expansion. Thus in the present hose arrangement reinforcement against expansion (and hence contraction) is provided in those regions where it has been determined that most expansion and contraction will tend to occur.

In turn this control of expansion (and hence contraction) can help relieve the stress on the inner tube 12 in this region as well as help reduce the wear on the inner tube 12 in this region due to the action of the outer tube 11 rubbing on the inner tube/elastomeric sleeve 6. That is to say because of the amount of expansion (and hence contraction) which occurs in this region has been reduced, the amount of rubbing which occurs due to the reciprocating motion in this region will also be reduced.

Thus the provision of the elastomeric sleeve as well as the connection of this sleeve to the inner and outer tubes at two longitudinally spaced locations can help provide a more reliable and robust hose arrangement.

Figure 6:
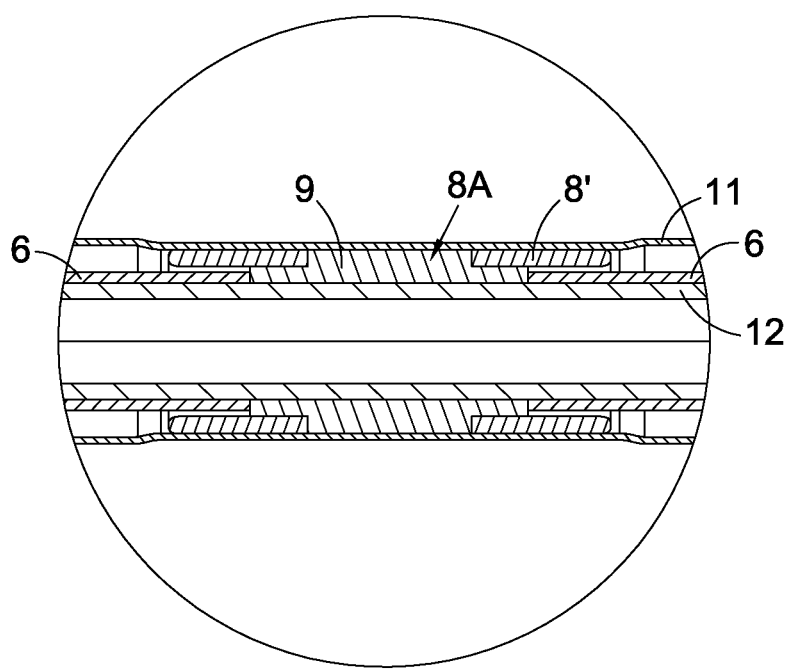
FIG. 6 is a view similar to that of FIG. 5 showing an alternative joiner member that may be used in an arrangement of the type shown in FIGS. 1 to 5.

FIG. 6 shows an alternative joiner member 8' in position between the outer and inner tube 11, 12 and the sleeve portion 6 which may be used in place of the joiner member 8 shown in FIGS. 3 and 5. The alternative joiner member 8' is again tubular but in this case includes an aperture 8A which can be aligned with the aperture A provided in the sleeve portion 6. This facilitates assembly by easing the process of introducing adhesive 9. In assembly the sleeve portion 6 is provided over the inner tube 12 and the joiner member 8' is slipped over the sleeve portion 6 to the location of the aperture A in the sleeve 6. Adhesive 9 can then be introduced via the aperture 8A in the joiner member 8' and flow from there to the aperture A in the sleeve portion 6 so contacting and bonding the sleeve 6 and inner tube 12 to the joiner member 8'. After this, typically when the adhesive 9 is dry, the outer tube 11 may be located over the inner tube 12 and sleeve 6 and the outer tube fixed (typically heat or sonic welded) to the joiner member 8'. Assembly to the adaptor 5 (or other hose end portion) can then be carried out when desired. With the joiner member 8' of FIGS. 3 and 5 applying adhesive is more difficult/messy, as it must be applied before locating the joiner member 8 but otherwise the assembly process is the same.

In other embodiments the hose arrangement may comprise the above hose assembly without the hose end components 2, that is, it may comprise the inner and outer tubes 12, 11, the sleeves 6, the adaptors 5 and the joining member 8. In such a case each adaptor 5 acts as a "hose end portion". In some such cases at least one of the tubes and sleeve may be held on the adaptor but not clamped until the tubes, sleeve and adaptor are clamped together by introduction into a hose end component. In yet other embodiments the adaptor 5 may be dispensed with and the inner and outer tubes 12, 11 and sleeves 6 may be arranged to be directly captured is a hose end component 2, e.g. conventional hose fitting. In such a case the hose end component acts as a "hose end portion".

In further embodiments the hose arrangement may include neither an adaptor 5 nor a hose end component 2 of the type described above, rather for example the ends of the tubes 12, 11 and sleeves 6 may be attached together in another way—for example they may be bonded perhaps with use of a joiner member similar to that described above.

The invention claimed is:

1. A hose arrangement comprising:
    an outer tube of flexible material and an inner tube of an elastic material for carrying fluid through the hose arrangement,
    wherein due to the action of the elastic inner tube, the hose arrangement has a shorter length in a contracted state in the absence of fluid pressure in the interior of the inner elastic tube and a longer length in an expanded state when fluid pressure is applied to the interior of the elastic inner tube, and
    the outer tube has an undulating state when the hose arrangement is in the contracted state and serves to control and contain expansion of the inner tube when the hose arrangement is in the expanded state,
    wherein at least one sleeve portion is provided between the elastic inner tube and the outer tube along at least part of a length of the elastic inner tube where undulation of the outer tube occurs in the contracted state for protecting the elastic inner tube from abrasion by the undulations of the outer tube, and
    wherein the hose arrangement comprises a first hose end portion for receiving a first end of the outer tube and a first end of the elastic inner tube for use in coupling the first ends of the tubes together and a second hose end portion for receiving a second end of the outer tube and a second end of the elastic inner tube for use in coupling the second ends of the tubes together and
    i) the sleeve portion, the outer tube and the inner tube are connected together at at least one location inwards of the first ends of the outer and inner tubes which location is inwards from the first hose end portion and the second hose end portion and
    ii) the sleeve portion is connected to the first hose end portion and/or connected to the inner tube and/or the outer tube at the region of the first hose end portion to enable control by the sleeve portion of longitudinal expansion and contraction of the hose arrangement between said at least one location and the first hose end portion.

2. A hose arrangement according to claim 1, in which the first and/or second hose end portion comprises an adaptor arranged for introduction in and clamping by a hose connector portion.

3. A hose arrangement according to claim 2, wherein the hose connector portion comprises a conventional hose fitting.

4. A hose arrangement according to claim 1, in which the first and/or second hose end portion comprises a hose connector portion.

5. A hose arrangement according to claim 1, in which the at least one sleeve portion extends beyond said at least one location inwards of the first end of the outer and inner tubes at which the at least one sleeve portion is connected to the outer tube and the inner tube.

6. A hose arrangement according to claim 1, in which the hose arrangement comprises a joiner member at the location at which the at least one sleeve portion is connected to the inner and outer tubes.

7. A hose arrangement according to claim 6, in which the outer tube, inner tube and sleeve portion are all attached to the joiner member.

8. A hose arrangement according to claim 6, further comprising an aperture or a break in the sleeve portion in the region of the joiner member with the joiner member bridging the aperture or break in the sleeve portion.

9. A hose arrangement according to claim 1, which comprises two sleeve portions.

10. A hose arrangement according to claim 9, in which a first of the sleeve portions is connected to the outer tube and the inner tube at a first location which is inwards of the first end of the tubes and a second of the sleeve portions is connected to the outer tube and the inner tube at a second location which is inwards of the second end of the tubes.

11. A hose arrangement according to claim 9, in which the first sleeve portion is connected to the first hose end portion and/or connected to at least one of the inner and outer tube at the region of the first hose end portion and the second sleeve portion is connected to the second hose end portion and/or connected to at least one of the inner and outer tube at the region of the second hose end portion.

12. A hose arrangement according to claim 1, further comprising a clamping member for clamping at least one of the outer tube, the inner tube and the sleeve portion to the first hose end portion, wherein the sleeve portion extends longitudinally inwards of the clamping member.

13. A hose arrangement according to claim 1, further comprising an expansion retainer for controlling radial expansion of the inner tube, wherein the sleeve portion extends longitudinally inwards of the expansion retainer.

14. A method of manufacturing a hose arrangement comprising an outer tube of flexible material and an inner tube of an elastic material for carrying fluid through the hose arrangement, wherein due to the action of the elastic inner tube, the hose arrangement has a shorter length in a contracted state in the absence of fluid pressure in the interior of the inner elastic tube and a longer length in an expanded state when fluid pressure is applied to the interior of the elastic inner tube, and the outer tube has an undulating state when the hose arrangement is in the contracted state and serves to control and contain expansion of the inner tube when the hose arrangement is in the expanded state, the method comprising:

providing at least one sleeve portion between the elastic inner tube and the outer tube along at least part of a length of the elastic inner tube where undulation of the outer tube occurs in the contracted state for protecting the elastic inner tube from abrasion by the undulations of the outer tube, wherein the hose arrangement comprises a first hose end portion for receiving a first end of the outer tube and a first end of the elastic inner tube for use in coupling the first ends of the tubes together and a second hose end portion for receiving a second end of the outer tube and a second end of the elastic inner tube for use in coupling the second ends of the tubes together and i) the sleeve portion, the outer tube and the inner tube are connected together at at least one location inwards of the first ends of the outer and inner tubes which location is inwards from the first hose end portion and the second hose end portion and ii) the sleeve portion is connected to the first hose end portion and/or connected to the inner tube and/or the outer tube at the region of the first hose end portion so enabling control by the sleeve portion of longitudinal expansion and contraction of the hose arrangement between said at least one location and the first hose end portion.

15. A hose arrangement comprising:

an outer tube of flexible material and an inner tube of an elastic material for carrying fluid through the hose arrangement;

wherein the outer tube has an undulating state when the hose arrangement is in a contracted state and is adapted to control and contain expansion of the inner tube when the hose arrangement is in an expanded state; and wherein due to the action of the elastic inner tube, the hose arrangement has a shorter length in the contracted state in the absence of fluid pressure in the interior of the inner elastic tube and a longer length in the expanded state when fluid pressure is applied to the interior of the elastic inner tube;

a first hose end portion receiving a first end of the outer tube and a first end of the elastic inner tube and coupling the first ends of the tubes together;

a second hose end portion receiving a second end of the outer tube and a second end of the elastic inner tube and coupling the second ends of the tubes together;

at least one sleeve portion between the elastic inner tube and the outer tube along at least part of a length of the elastic inner tube where undulation of the outer tube occurs in the contracted state for protecting the elastic inner tube from abrasion by the undulations of the outer tube;

a first connecting location where the sleeve portion, the outer tube and the inner tube are connected together inwards of and spaced from the first hose end portion and the second hose end portion; and a second connecting location where the sleeve portion is connected to the first hose end portion and/or connected to the inner tube and/or the outer tube at the region of the first hose end portion to enable control by the sleeve portion of longitudinal expansion and contraction of the hose arrangement between the first connecting location and the second connecting location;

wherein the first connecting location and the second connecting location are discrete locations spaced from one another along the length of the hose arrangement and there is an unconnected region of sleeve between the first connecting location and the second connecting location in which unconnected region the sleeve is not connected to the inner tube and the sleeve is not connected to the outer tube.

16. A hose arrangement according to claim 15, wherein the sleeve portion, the outer tube and the inner tube are connected together at a plurality of distinct locations inwards of the first ends of the outer and inner tubes; said locations being inwards of and spaced from the first hose end portion and the second hose end portion.

* * * * *